United States Patent

Hu et al.

[11] Patent Number: 5,939,618
[45] Date of Patent: *Aug. 17, 1999

[54] APPARATUS AND METHOD FOR DETECTING LEAKAGE IN A GAS REACTOR

[75] Inventors: Tien J. Hu, Ping-Tung; Jeng D. Tseng, Hsin-Chu, both of Taiwan

[73] Assignee: Taiwan Semiconductor Manufacturing Company, Ltd., Hsin-Chu, Taiwan

[*] Notice: This patent is subject to a terminal disclaimer.

[21] Appl. No.: 08/908,882

[22] Filed: Aug. 8, 1997

[51] Int. Cl.[6] .......................... G01M 3/26; C01B 13/10; B01D 24/00; B01J 14/08

[52] U.S. Cl. ................ 73/40; 204/176; 422/186.07; 210/760

[58] Field of Search .............. 73/40.7, 40.5 R, 73/40.5 A, 49.2, 40; 702/45; 422/186.07; 204/176; 210/760

[56] References Cited

U.S. PATENT DOCUMENTS

| | | | |
|---|---|---|---|
| 3,695,094 | 10/1972 | Hulme | 73/40.5 R |
| 4,106,099 | 8/1978 | Elliott et al. | 702/45 |
| 4,118,780 | 10/1978 | Hirano | 702/45 |
| 4,856,321 | 8/1989 | Smalling et al. | 73/40.5 A |
| 5,297,423 | 3/1994 | Keating et al. | 73/49.2 |
| 5,453,944 | 9/1995 | Baumoel | 364/578 |
| 5,604,298 | 2/1997 | Dosoretz et al. | 73/23.2 |
| 5,644,070 | 7/1997 | Gibboney et al. | 73/23.2 |

*Primary Examiner*—Hezron Williams
*Assistant Examiner*—Jay L. Politzer
*Attorney, Agent, or Firm*—Tung & Associates

[57] ABSTRACT

The present invention discloses an apparatus and a method for detecting a gas leakage from a gas reactor by utilizing flow sensors mounted on and in fluid communication with a gas inlet conduit and a gas outlet conduit. The volume of gas flow through the inlet conduit and the outlet conduit are continuously monitored while the gas reactor is in its operating mode so that any gas leakage can be detected and the gas reactor can be shut off or bypassed in order to eliminate fire and safety hazards.

20 Claims, 1 Drawing Sheet

APPARATUS AND METHOD FOR DETECTING LEAKAGE IN A GAS REACTOR

FIELD OF THE INVENTION

The present invention generally relates to an apparatus and a method for detecting gas leakage from a reactor and more particularly, relates to an apparatus and a method for detecting ozone leakage from an ozone generator by comparing the gas flow rate in an inlet conduit and the gas flow rate in an outlet conduit, wherein the comparison is preferably carried out by a logic device.

BACKGROUND OF THE INVENTION

In the fabrication process for integrated circuit devices, various chemicals including gases and liquids are utilized. One of such gases utilized more recently as a reactant in a silicon oxide deposition process or a cleaning agent for wafer surfaces is ozone. For instance, silicon oxide films can be deposited onto semiconductor wafers at atmospheric pressure and at a low deposition temperature by reacting tetraethoxysilane (TEOS) with ozone. Ozone is used as an reactant to produce films which exhibit smooth profiles over steps and therefore can be used to fill high aspect ratio gaps between metal lines. Silicon oxide films produced by ozone and TEOS is most suitable for inter-metal dielectrics.

Ozone has also been used as an effective cleaning agent for wafer surfaces. For instance, after a photolithographic process, a photoresist layer is usually stripped by a combination of a dry ashing process with ozone and then wet cleaned by $H_2SO_4/H_2O_2$. In the process, most of the organic residue from photoresist can be removed in the ozone ashing process while the wet cleaning is used to render the wafer surface completely clean. In another process that utilizes ozone for cleaning, ultrapure water injected with ozone is also used to clean wafer surfaces. In the process where ozone is first dissolved in ultrapure water, ozone decomposes and becomes a strong oxidizing agent which is capable of decomposing organic impurities. The ozone-injected ultrapure water cleaning process therefore provides the advantages of lower cleaning temperature, simplified process, and reduced chemical consumption and waste. There is, however, a side effect with the ozone cleaning process in that native oxide may grow on the wafer surface at high ozone concentrations. After an ozone cleaning process is conducted on a wafer surface, the organic contaminant-free surface resulting from the ozone treatment further helps subsequent cleaning steps to function properly. Overall, the ozone-injected ultrapure cleaning process is an effective method to remove all organic impurities on a wafer surface. It can be carried out at room temperature and can be used to replace a conventional $H_2SO_4/H_2O_2$ wet cleaning process.

Ozone is a triatomic allotrope of oxygen which has a characteristic pungent odor. Ozone is produced naturally in the earth's stratosphere by the absorption of solar radiation into oxygen. Ozone is also present in the earth atmosphere in low concentration as a consequence of intrusions of stratospheric air. Since ozone exists in an unstable state, it decomposes into oxygen at normal temperature and pressure. Such characteristic enables ozone to be a powerful oxidizing agent. Its strong ability to oxidize has therefore been utilized in the fabrication processes for integrated circuit devices whenever an oxidation process is desired.

In a semiconductor fabrication facility, ozone is normally generated by a silent discharge method such that a large quantity of ozone in higher concentration can be produced for production used. In the silent discharge technique, an oxygen gas is passed through inbetween two electrodes which are coated by a ceramic dielectric material and are separated with a narrow gap formed inbetween. Such an electrode arrangement is known as a discharge cell. The reaction to form ozone can be initiated when a voltage is applied to the discharge cell. Oxygen molecules are decomposed into oxygen atoms from the collisions between the electrons and the oxygen molecules. The active oxygen atoms then recombine with surrounding oxygen molecules to form ozone. The reaction can be expressed as $3\ O_2 \rightarrow 2\ O_3$. The ozone synthesis process proceeds in an equilibrium chemical reaction. The reaction rate increases as the reaction temperature is increased. Since most of the energy applied to the discharge cell is converted to heat and that if the heat is not removed, the ozone produced will be destructed at the high temperature. As a consequence, the discharge cell for ozone production must be cooled efficiently by a heat exchanger method.

In order to supply a large enough volume for ozone of production use in a semiconductor fabrication plant, a series of ozone generators (or ozone generating cells) are connected together in parallel so that a high concentration and large volume of ozone can be generated as a reliable supply to a deposition or a cleaning process. With the increasing number of ozone generating cells used, the chances of having ozone leaks from one or more of the cells become significantly higher. When ozone leaks from a generating cell in a semiconductor fabrication plant, several problems can occur due to the leakage. First, since ozone breaks down easily into oxygen at normal temperature and pressure, and oxygen can help combustion of many flammable materials which are frequently used in a semiconductor fabrication plant, the ozone leakage presents a fire and explosion hazard. Secondly, the inhalation of ozone into human body may also produce various health hazards that may be detrimental to the plant workers. The ozone gas has an unpleasant, pungent odor that is objectionable to most plant workers. Unfortunately, the commercially supplied ozone generator or generating cells are not normally equipped with leakage detectors which can be used to effectively detect ozone leakage and thus enables an operator to attend to the problem.

It is therefore an object of the present invention to provide an ozone generator that does not have the drawbacks and shortcomings of the conventional ozone generators.

It is another object of the present invention to provide an apparatus to be used with a gas reactor for detecting any gas leakage from the reactor.

It is a further object of the present invention to provide an apparatus for use with a gas reactor that can be easily added to the reactor for detecting any gas leakage.

It is still another object of the present invention to provide an apparatus for use with an ozone generator that can be used effectively to detect any ozone leakage from the generator.

It is another further object of the present invention to provide an apparatus for use with an ozone generator that consists of simple flow sensors that are mounted to an inlet and an outlet of an ozone generator.

It is yet another object of the present invention to provide an apparatus for use with an ozone generator that utilizes flow sensors mounted to the inlet conduit and the outlet conduit of the generator such that the outputs from the sensors can be monitored.

It is still another further object of the present invention to provide an apparatus for use with an ozone generator that utilizes flow sensors which are mounted to the inlet conduit and the outlet conduit of the generator such that the outputs from the sensors can be monitored by a logic device.

It is yet another further object of the present invention to provide a method for monitoring ozone leakage from an ozone generator by mounting flow sensors to the inlet and the outlet of the generator and comparing the volume of gases flowing in and out of the generator.

SUMMARY OF THE INVENTION

In accordance with the present invention, an apparatus and a method for detecting gas leakage from a gas reactor such as an ozone generator is provided which utilizes flow sensors mounted to the inlet and the outlet of the generator such that volumes of gas flowing into and out of the generator can be monitored and compared continuously to detect any gas leakage.

In a preferred embodiment, the present invention apparatus for detecting gas leakage from a gas reactor is provided which includes a first conduit for feeding a reactant gas to a gas reactor, a second conduit for withdrawing a product gas from the gas reactor, a first flow sensor in fluid communication with the first conduit for outputting a first signal indicative of a flow rate in the first conduit, a second flow sensor in fluid communication with the second conduit for outputting a second signal indicative of a flow rate in the second conduit, and a device for comparing the first signal to the second signal and for determining a leakage status of the gas reactor.

In another preferred embodiment, an apparatus for detecting ozone leakage from an ozone generator is provided which includes a first conduit for feeding a reactant gas to an ozone generator, a second conduit for withdrawing ozone from the ozone generator, a first flow sensor in fluid communication with the first conduit for outputting a first signal indicative of a flow rate in the first conduit, a second flow sensor in fluid communication with the second conduit for outputting a second signal indicative of a flow rate in the second conduit, and a device for comparing the first signal to the second signal and for determining a leakage status of the ozone generator.

The present invention is further directed to a method for detecting ozone leakage from an ozone generator which can be carried out by the operating steps of first providing an ozone generator that has an inlet conduit and an outlet conduit, then monitoring a first flow rate in the inlet conduit, monitoring a second flow rate in the outlet conduit, and then comparing the first flow rate to the second flow rate.

BRIEF DESCRIPTION OF THE DRAWINGS

These and other objects, features and advantages of the present invention will become apparent from the following detailed description and the appended drawings in which.

DETAILED DESCRIPTION OF THE PREFERRED AND ALTERNATE EMBODIMENTS

Figure 1:
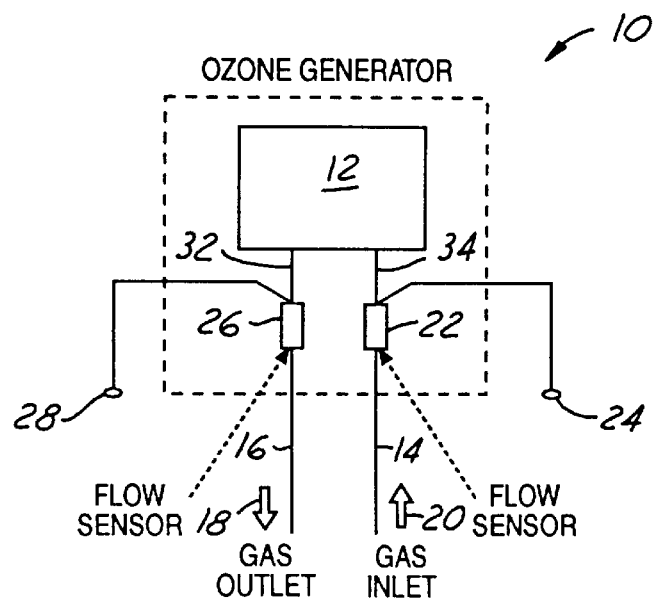
FIG. 1 is an illustration of the present invention apparatus in a preferred embodiment.

The present invention discloses an apparatus and a method for detecting gas leakage from a gas reactor by providing flow sensors to an inlet conduit and an outlet conduit of the gas reactor and monitoring the gas flow rates in the conduit such that any gas leakage can be detected when the flow rates differ from each other. The apparatus and method can be utilized for detecting any gas leakage from any type of gas reactors and particularly, are most suitable for detecting ozone leakage from an ozone generating device. Ozone leakage in a semiconductor fabrication plant can be hazardous both from a fire hazard and worker health and safety standpoints.

The present invention apparatus can be provided with a built-in flow sensor at the inlet end of an ozone generator, a built-in flow sensor at the outlet end of the generator and then monitoring and comparing the flow rates obtained from the sensors either manually by a machine operator or by a logic device such as digital circuits. When the flow rates detected in the inlet end and the outlet end of an ozone generator are different, specifically when the flow rate at the outlet end is smaller than the flow rate at the inlet end, it is likely that ozone leakage has occurred in the generating cell after the ozone formation process or before the generating process by leaking out oxygen that was fed into the generating cell. The flow sensors can be easily attached to the inlet conduit and the outlet conduit of the generating cell such that they are in fluid communication with the fluid conduits and that accurate flow rates can be monitored during the operation of the cell. It should be noted that the flow rates are assumed to be the same when indicating no leakage only if the conduits are of the same size and dimension in cross-section. In any event, the volume of gas flown into the conduit at the inlet and at the outlet should always be the same. When the readings from the flow sensors are different and the signals are monitored by a logic device, an alarm will sound and a display will flash at the control panel of the process machine. The specific ozone generating cell will then be stopped or bypassed to enable service to be performed on the generator.

In a semiconductor fabrication plant, the ozone generators are normally installed at a close proximity to a process machine that required ozone. However, the ozone generators may be installed at a different floor that is under the process machine for safety reasons. The ozone generated from the ozone generators is then piped to the process machine through the floor of the plant. In a typical semiconductor fabrication set up, a series of ozone generating cells or ozone generators are used for each process machine or for a series of process machines. The use of a multiplicity of ozone generating cells is necessary and desirable since it guarantees a large volume and high concentration of ozone can be generated to sufficiently supply the process machines. When leakage from one of the generating cell is detected, the cell can be stopped and bypassed while the other generating cells are still able to adequately supply the process machines.

The flow sensors used on the conduits for the inlet and the outlet of the ozone generator can be one of many different commercially available sensors. The output signal from the sensors can be shown on a display mounted on a control panel so that they can be monitored manually by a machine operator. More preferably, the output signals are fed to a logic device which consists of at least an AND gate or a OR gate for outputting a signal when both sensor outputs are the same or are above a threshold value. For instance, when transistor-transistor logic (TTL) devices are used, a voltage higher than 3.3 volts indicates a high reading or a "1" reading. When the sensor senses a voltage of less than 3.3 volts, a low TTL signal or a "0" signal is sent out as an indication for the detection. The two TTL signals obtained from the two flow sensors can therefore be constantly monitored either manually by a machine operator or automatically by a logic device to ensure the proper function of the ozone generating cell.

Referring now to FIG. 1, wherein an illustration of the present invention apparatus in a preferred embodiment is shown. The apparatus 10 includes an ozone generator 12, an inlet conduit 14 to the ozone generator 12 and an outlet conduit 16 from the generator 12. On the inlet conduit 14, a flow sensor 22 is connected in fluid communication with the conduit such that the volume of gas flow through conduit 14 can be monitored. The flow sensor 22 produces an output signal which can be mounted at terminal 24. At the outlet conduit 16, a flow sensor 26, similar to that used on the inlet conduit 14, is used to monitor the gas flow volume through conduit 16. An output signal from sensor 26 can be monitored at terminal 28. The signal outputs from terminals 24 and 28 can be fed to flow meters mounted in a control panel on the process machine such that a machine operator can continuously monitor the inlet gas flow to the generator 12 and the outlet gas flow from the generator 12.

When the output signal 28 indicates a smaller gas volume than the input signal 24, it is an indication that ozone generated by the generator 12 may have leaked out in the section 32 of the conduit after the ozone formation. It may also indicate that the oxygen reactant 20 fed to the inlet conduit 14 may have leaked out in section 34 of the conduit prior to the ozone transformation process in the generator 12. When the ozone output 18 monitored by the sensor 26 is the same as the oxygen input 20, it is an indication that generator 12 is functioning properly and converting all the input oxygen 20 into output ozone 18. It should be noted that the ozone generator 12 is only used to illustrate the present invention preferred embodiment. The present invention apparatus for monitoring a gas reactor by using flow sensors 22, 26 and reading the sensor output signals from terminals 24 and 28 can be utilized on any gas reactors wherein an input gas is reacted to produce an output gas. For instance, in applications where a toxic gas such as carbon monoxide may be converted to carbon dioxide in a gas reactor by combining with oxygen and thus producing non-toxic carbon dioxide at the outlet end. Other toxic gas conversion techniques may also advantageously utilize the present invention apparatus. In such toxic gas conversion processes, it is critical to utilize the present invention apparatus such that the exact input volume and the exact output volume can be monitored. This prevents any leakage of toxic reactant gases at the input end by a quick determination of the flow volume at the output end when the flow sensors detect different flow volumes.

Figure 2:
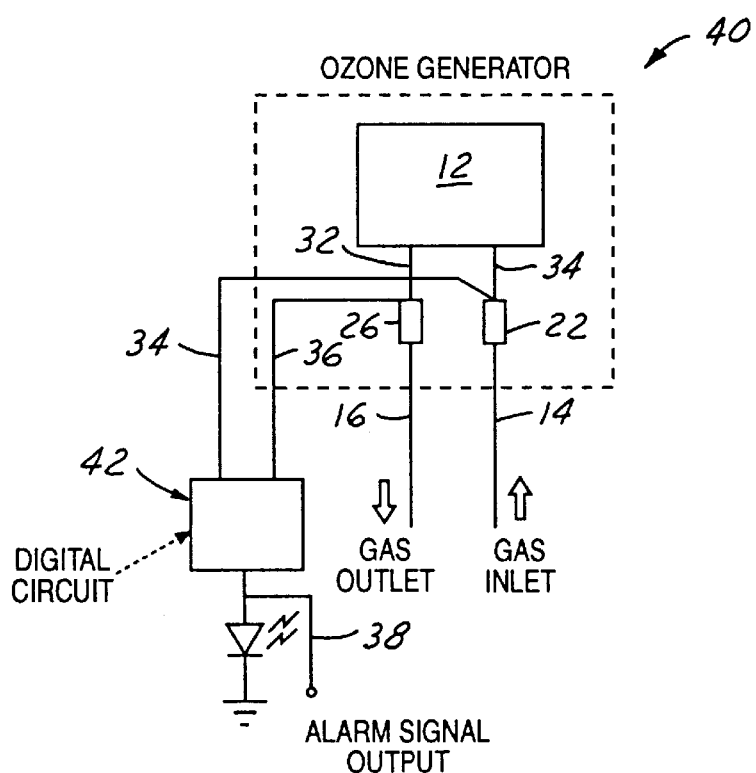
FIG. 2 is an illustration of the present invention apparatus in an alternate embodiment wherein a digital circuit is used for monitoring of the flow sensor outputs.

The present invention novel apparatus and method can also be carried out in a more automated manner as shown in FIG. 2. Instead of manual reading of the flow meters to determine whether the output gas volume is equivalent to the input gas volume by a machine operator, the apparatus 40 shown in FIG. 2 additionally utilizes a logic device 42 to automatically determine whether the flow volume in the outlet conduit is the same as in the inlet conduit. An output signal 34 from the flow sensor 22 on the inlet conduit 14 is now fed directly to the logic device 42. Similarly, an output signal 36 from the flow sensor 26 mounted on the gas outlet conduit 16 is fed directly to the logic device 42. The logic device 42 consists of a digital circuit such as an AND gate or an OR gate for determining and comparing the two flow volumes in the conduits. When the output signals 34 and 36 are different, an alarm signal 38 is outputted from the logic device 42 to sound an alarm (not shown). This is a more preferred apparatus since it does not require the manual monitoring of the flow meters and the manual determination whether the flow volumes in the inlet conduit and the outlet conduit are different. The digital circuit contained in the logic device 42 can be mounted as part of a control panel on a process machine such that the location or the identification of the ozone generating cell can be readily identified when any suspected leakage occurs. The corresponding generating cell can then be automatically shut off or bypassed or manually shut off by the machine operator. The logic device 42 can be simply constructed with an AND gate or an OR gate. For instance, a signal larger than 3.3 volts from a TTL (transistor-to-transistor logic) would be recognized as a high or a "1". When both signals 34 and 36 reads a high or a "1", it indicates that the ozone generator 12 functions properly and that no leakage has occurred. To the contrary, when one signal output reads a high and the other output reads a low or "0", it is an indication that the volume flow in the two conduits are different and that a leakage has occurred.

The flow sensors 22 and 26 utilized in the present invention apparatus may be readily supplied by any commercial sources. The sensitivity required is approximately 1 cubic centimeter/second.

The present invention novel apparatus and method have therefore been amply demonstrated by the above descriptions and FIGS. 1 and 2. It should be noted that while in the preferred and the alternate embodiment, an ozone generating cell is used as an illustration for the present invention, the present invention is not limited to such applications. The present invention apparatus and method can be used in any gas reactors for detecting any kind of gas leaks. It is most suitably used in detecting toxic gas leakage when such gas is being converted to a non-toxic and therefore non-harmful gas by a gas reactor.

While the present invention has been described in an illustrative manner, it should be understood that the terminology used is intended to be in a nature of words of description rather than of limitation.

Furthermore, while the present invention has been described in terms of a preferred and alternate embodiment, it is to be appreciated that those skilled in the art will readily apply these teachings to other possible variations of the inventions.

The embodiment of the invention in which an exclusive property or privilege is claimed are defined as follows:

1. An apparatus for detecting gas leakage in a silent discharge ozone gas reactor comprising:

a first conduit for feeding a reactant gas to a silent discharge ozone gas reactor, a second conduit for withdrawing a product gas from said gas reactor, a first flow sensor in fluid communication with said first conduit for outputting a first signal indicative of a flow rate in said first conduit, a second flow sensor in fluid communication with said second conduit for outputting a second signal indicative of a flow rate in said second conduit, and means for comparing said first signal to said second signal and for determining a leakage status of said gas reactor.

2. An apparatus according to claim 1, wherein said means for comparing said first signal to said second signal and for determining a leakage status of the gas reactor comprises manual observation of flow rate readings in said first and second conduit.

3. An apparatus according to claim 1, wherein said means for comparing said first signal to said second signal and for determining a leakage status of the gas reactor comprises a logic device having at least one logic gate.

4. An apparatus according to claim 1, wherein said means for comparing said first signal to said second signal and for determining a leakage status of the gas reactor comprises a digital circuit.

5. An apparatus according to claim 1, wherein said gas reactor is an ozone generator.

6. An apparatus according to claim 1, wherein said reactant gas comprises oxygen and said product gas comprises ozone.

7. An apparatus according to claim 1, wherein said gas reactor is an electrostatic discharge type ozone generator.

8. An apparatus for detecting ozone leakage from an silent discharge ozone generator comprising:

a first conduit for feeding a reactant gas to an silent discharge ozone generator, a second conduit for withdrawing ozone from said silent discharge ozone generator, a first flow sensor in fluid communication with said first conduit for outputting a first signal indicative of a flow rate in said first conduit, a second flow sensor in fluid communication with said second conduit for outputting a second signal indicative of a flow rate in said second conduit, and means for comparing said first signal to said second signal and for determining a leakage status of said silent discharge ozone generator.

9. An apparatus according to claim 8, wherein said reactant gas comprises oxygen.

10. An apparatus according to claim 8, wherein said means for comparing said first signal to said second signal and for determining a leakage status of the ozone generator comprises a machine operator visually observing flow rate readings.

11. An apparatus according to claim 8, wherein said means for comparing said first signal to said second signal and for determining a leakage status of the ozone generator comprises a logic means having at least one logic gate.

12. An apparatus according to claim 8, wherein said means for comparing said first signal to said second signal and for determining a leakage status of the ozone generator comprises a digital circuit.

13. An apparatus according to claim 8 further comprising an alarm means connected to said means for determining a leakage status of said ozone generator for sounding an alarm when a leakage of ozone is detected.

14. An apparatus according to claim 8, wherein said ozone generator is of the electrostatic discharge type.

15. An apparatus according to claim 8, wherein said first and second flow sensors have a sensitivity of one cubic centimeter/second.

16. A method for detecting ozone leakage from an silent discharge ozone generator comprising the steps of:

providing an ozone generator having an inlet conduit and an outlet conduit, monitoring a first flow rate in said inlet conduit, monitoring a second flow rate in said outlet conduit, and comparing said first flow rate to said second flow rate.

17. A method according to claim 16, wherein said inlet conduit conveys an oxygen reactant gas and said outlet conduit conveys an ozone product gas.

18. A method according to claim 16, wherein said first and second flow rate are monitored by flow sensors.

19. A method according to claim 16 further comprising the step of sounding an alarm when said second flow rate monitored is smaller than said first flow rate monitored.

20. A method according to claim 16 further comprising the step of comparing said first flow rate to said second flow rate by a logic device.

* * * * *